United States Patent [19]

Davie

[11] Patent Number: 5,894,693
[45] Date of Patent: Apr. 20, 1999

[54] BUG MASTER FISHING LURE

[76] Inventor: William L. Davie, 77 Lake Ave., Staten Island, N.Y. 10303

[21] Appl. No.: 08/899,486

[22] Filed: Jul. 19, 1997

[51] Int. Cl.$^6$ .................................................. A01K 85/00
[52] U.S. Cl. .................. 43/42.24; 43/42.32; 43/42.35; 43/42.39
[58] Field of Search .................. 43/42.24, 42.45, 43/42.48, 42.53, 42.36, 42.39, 42, 42.32, 42.35

[56] References Cited

U.S. PATENT DOCUMENTS

| | | | |
|---|---|---|---|
| 2,183,816 | 12/1939 | Lovelace | 43/46 |
| 2,184,031 | 12/1939 | Wyatt | 43/46 |
| 2,231,949 | 2/1941 | Rinehart . | |
| 2,473,142 | 6/1949 | Gilmore . | |
| 2,603,902 | 7/1952 | Stanwyck | 43/42.36 |
| 3,344,550 | 10/1967 | Peters | 43/42.14 |
| 3,421,249 | 1/1969 | Jeffers . | |
| 4,186,510 | 2/1980 | Kimerer . | |
| 4,738,047 | 4/1988 | Ryan . | |
| 4,862,629 | 9/1989 | Ryan . | |
| 4,862,630 | 9/1989 | Ryan . | |

*Primary Examiner*—Jack W. Lavinder
*Attorney, Agent, or Firm*—Michael I Kroll

[57] ABSTRACT

A bug master fishing lure (16) comprising a flexible cylindrical body core (18) coated with a silicone skin (40). A pair of movable eyes (43) are attached to a forward end of the silicone skin (40), while paint (44) is placed upon the silicone skin (40), so as to give the lure (16) an extremely realistic look. It can be assembled as a surface popper (27), so as to create a surface splashing action in water and as a diver (60), so as to create a diving, wobbling action in the water.

30 Claims, 7 Drawing Sheets

BUG MASTER FISHING LURE

BACKGROUND OF THE INVENTION

1. Field of the Invention

The instant invention relates generally to fishing lures and more specifically it relates to a bug master fishing lure. The bug master fishing lure has a soft and flexible body for a natural feel, while artificial movable eyes that rattle will attract fish to it.

2. Description of the Prior Art

Numerous fishing lures have been provided in prior art. For example, U.S. Pat. Nos. 2,231,949 to Rinehart; 2,473,142 to Gilmore; 3,421,249 to Jeffers; 4,186,510 to Kimerer Jr.,; 4,738,047 to Ryan; 4,862,629 to Ryan and 4,862,630 to Welch all are illustrative of such prior art. While these units may be suitable for the particular purpose to which they address, they would not be as suitable for the purposes of the present invention as heretofore described.

RINEHART, FRED ELMUS

FISHING LURE

U.S. Pat. No. 2,231,949

An artificial lure comprising a fishhook with an eye. A body of soft, deformable material is mounted on the shank of the hook. A band means divides the body into a plurality of sections. Knots are tied in the band means and placed so that the lure is off balance. Elongated and highly flexible threads are secured to the body and project laterally therefrom, forming legs simulating the legs or antennae of a live fly, bug or the like and are designed so as to quiver when the lure is used in fishing. A cord is provided, in which one end is passed through the body and one end through the eye of the hook with the two ends being tied together to form a knot. Means is for cooperatively securing the body and the hook together.

GILMORE, BASIL E.

ARTIFICIAL FISH LURE

U.S. Pat. No. 2,473,142

As a new article of manufacture, a fishhook includes a shank having an intermediate hump. A wrapping around the shank completely covers the hump and adjacent portions of the shank on opposite sides of the hump. A plurality of flexible feelers are coiled and tied around the wrapping and held within the crotch portion of the hump.

JEFFERS WILLIAM D.

FISHHOOK

U.S. Pat. No. 3,421,249

In combination with a molded thermosetting plastic fish-shaped lure body, a fishhook includes a pair of shanks arranged generally parallel to each other and defining therebetween a line-attaching eye. One of the shanks being integral with a hook and the other of the shanks being integral with an aperture lateral projection suitable for enclosure within the thermosetting plastic body.

KIMERER JR., NEIL B.

FLAT-BODIED NYMPH HOOK

U.S. Pat. No. 4,186,510

This invention is a fishing fly lure of a flat-bodied nymph hook comprising a fishing hook. A double-bowed center section is attached to the fishing hook and a fishing eye is attached to the double-bowed center section. The double-bowed center section is wrapped with fly preparation threaded to form a flat center section of the fishing lure.

RYAN, VERNON E.

FISH LURE AND METHOD OF MAKING THE SAME

U.S. Pat. No. 4,738,047

A non-diving fish lure having a fishhook with a bill, and a spherical body. A spoon is implanted into the lower portion of the spherical body and angles upwardly until an end of the spoon is on a common horizontal plane with a section of the bill. A method is for producing the fish lure.

RYAN, VERNON E.

FISH LURE

U.S. Pat. No. 4,862,629

A non-diving fish lure having a fishhook with a bill, and a spherical body. A spoon is implanted into the lower portion of the spherical body and angles upwardly until an end of the spoon is on a common horizontal plane with a section of the bill. A method is for producing the fish lure.

WELCH, RAYMOND M.

FISHING LURE

U.S. Pat. No. 4,862,630

A fishing lure has a crab-shaped body portion provided with a plurality of pair of legs extending from opposite sides of the body. The lure is preferably molded from a flexible plastic material and is painted or otherwise colored to have a green upper surface with brown spots and a whitish undersurface in fluorescent color to simulate a live crab. A lower section of each of the legs is provided with a cavity to catch water currents during use and to produce life-like movement of the leg. The cross sectional areas of the cavities may be varied between legs to produce different rates of movement of the various legs. Wire stiffeners may be provided in an upper section of each leg to produce varying rates of movement between the upper and lower leg sections. The upper leg sections may be formed with a rearwardly extending stabilizing flap to control leg movement. A stabilizing fin may be provided in a recess formed in the undersurface of the body portion.

SUMMARY OF THE INVENTION

A primary object of the present invention is to provide a bug master fishing lure that will overcome the shortcomings of the prior art devices.

Another object is to provide a bug master fishing lure in which the body is soft and flexible and has a natural feel, while artificial movable eyes rattle to attract fish to it.

An additional object is to provide a bug master fishing lure in which it can be assembled to function as a surface popper, so as to create a surface splashing action in the water and it can also be assembled to function as a diver to sink and create a diving, wobbling action.

A further object is to provide a bug master fishing lure that is simple and easy to use.

A still further object is to provide a bug master fishing lure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Turning now descriptively to the drawings, in which similar reference characters denote similar elements throughout the several views, FIGS. 1 through 14 illustrate a bug matter fishing lure 16 of the present invention. With regard to the reference numerals used, the following numbering is used throughout the various drawing figures.

16 bug master fishing lure
18 flexible cylindrical body core of 16
20 transverse hole in 18
22 hot iron for 20
24 mouth in 18
26 another hot iron for 24
27 surface popper for 16
28 wire member of 16
30 eye on 28
32 barrel swivel of 16
34 weight of 27
36 tail loop on 28
38 thin wire of 16
40 silicone skin of 16
42 applicator tube for 40
43 movable eye of 16
44 paint of 16
46 paint brush for 44
48 first treble hook of 16 on 32
50 second treble hook of 16 on 36
52 solid foam material for 18
54 pliable metal material for 28
56 lead for 34 and 64
58 malleable metal material for 38
60 diver for 16
62 right angle bend in 28
64 weight of 60

Figure 1:
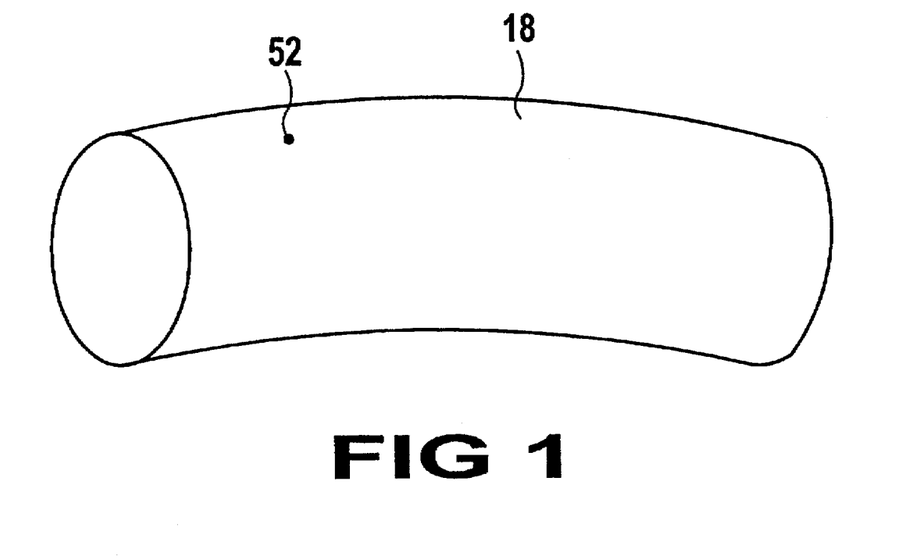
FIG. 1 is a perspective view of a solid foam cylindrical body core of the instant invention.
Figure 2:
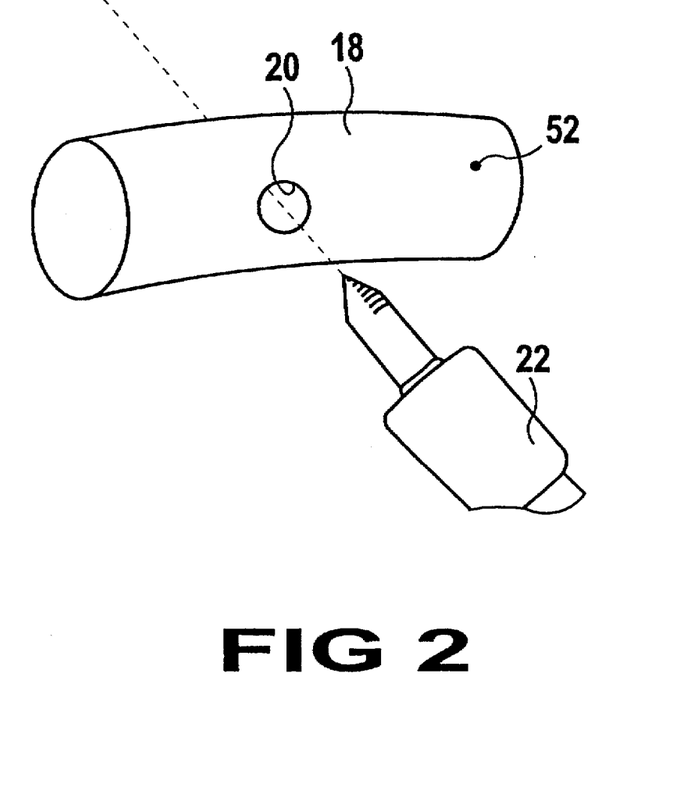
FIG. 2 is a perspective view showing a transverse hole put through the middle of the cylindrical body core by a hot iron.
Figure 3:
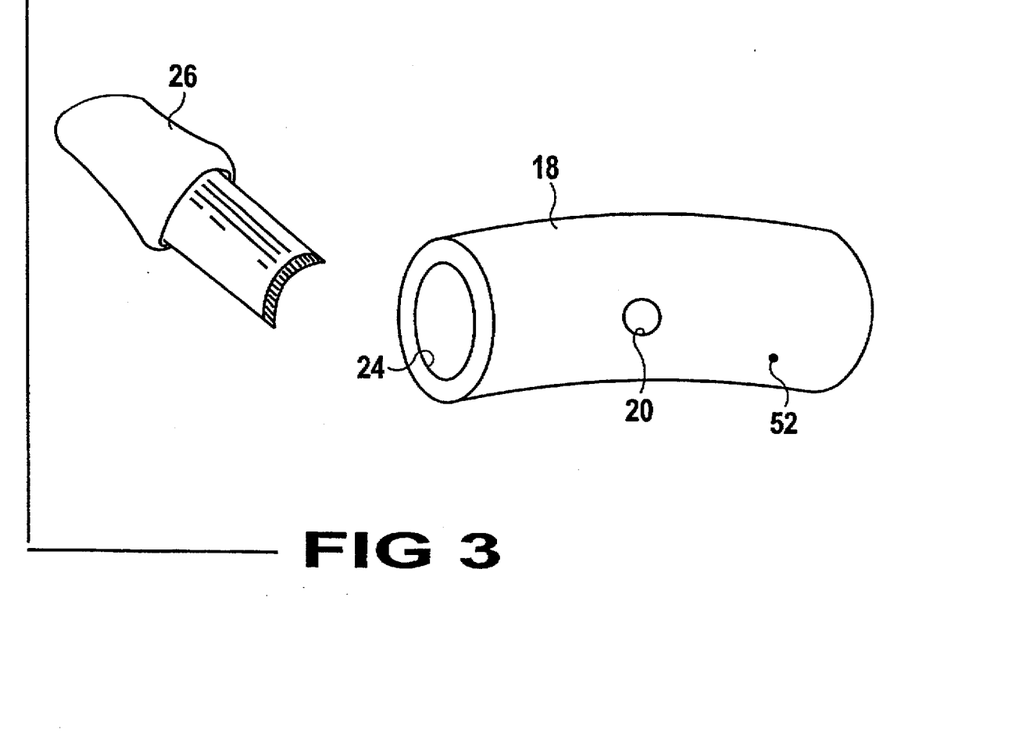
FIG. 3 is a perspective view showing a mouth scooped out of a forward end of the cylindrical body core by another hot iron.
Figure 4A:
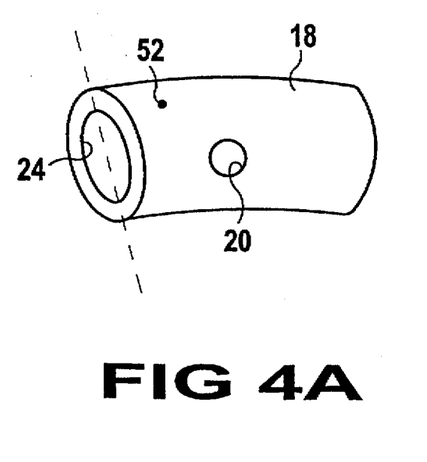
FIG. 4A is a perspective view of the cylindrical body core with the mouth facing downward to be utilized in making a surface popper.
Figure 4B:
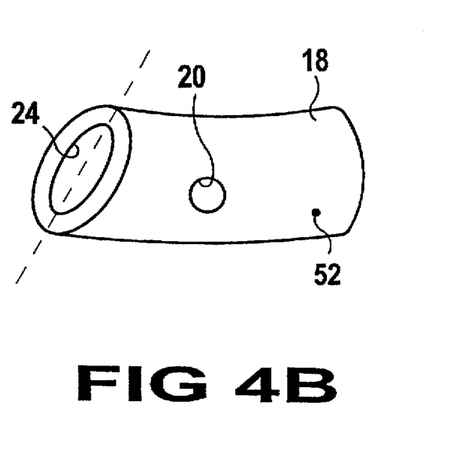
FIG. 4B is a perspective view of the cylindrical body core with the mouth facing upward to be utilized in making a diver.
Figure 5:
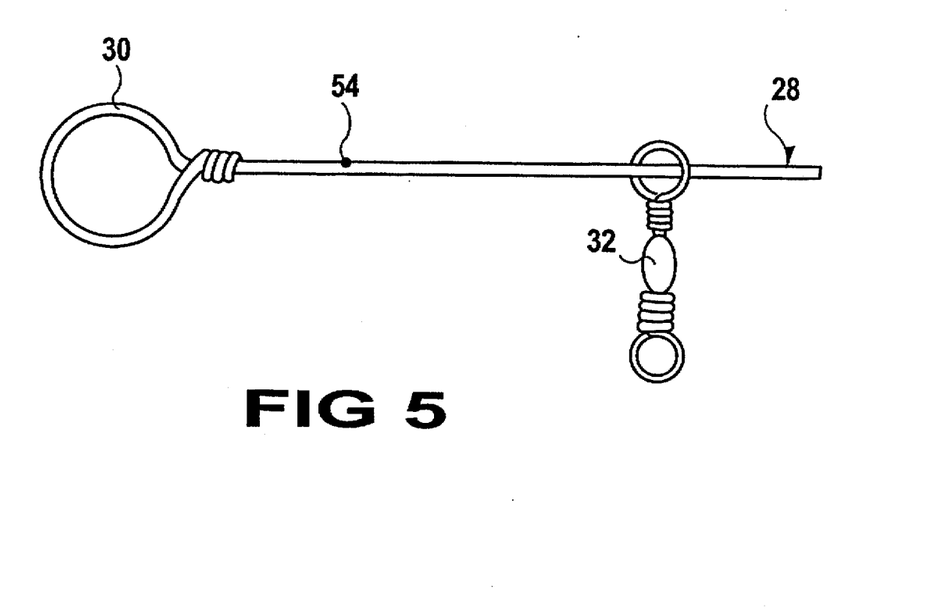
FIG. 5 is a perspective view of a wire member having an eye formed on a first end and a barrel swivel carried on the center wire.
Figure 6:
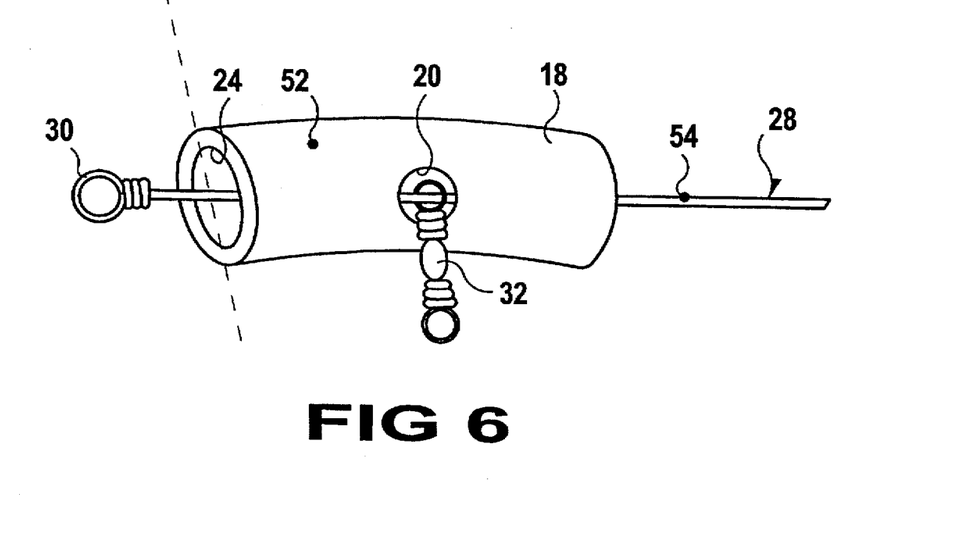
FIG. 6 is a perspective view similar to FIG. 4A, showing the wire member inserted through the mouth of the cylindrical body core and the barrel swivel extending out from the transverse hole.
Figure 7:
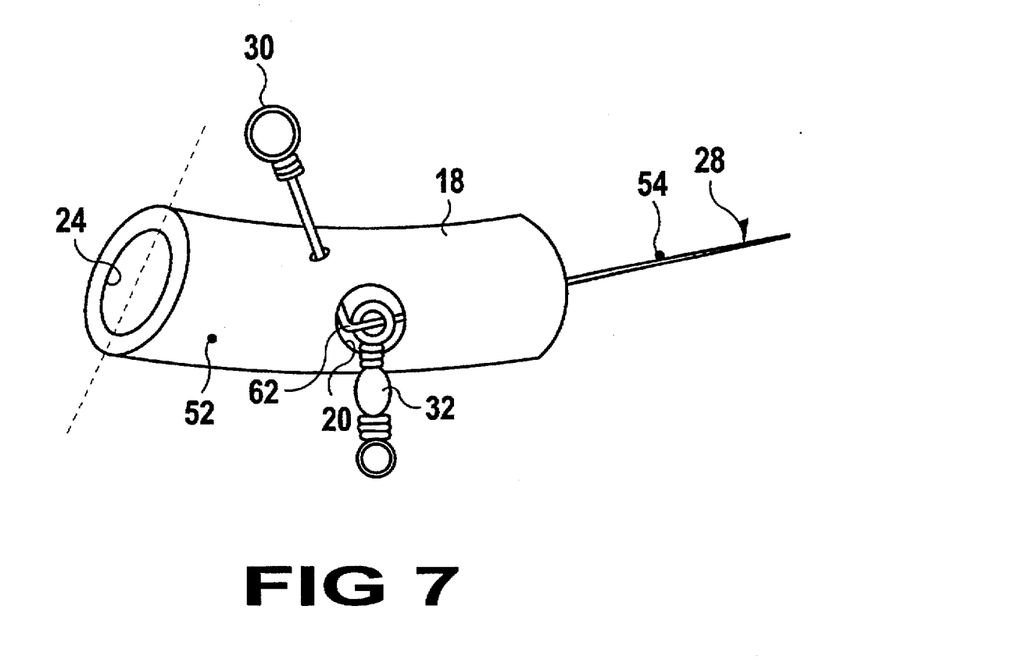
FIG. 7 is a perspective view similar to FIG. 4B, showing the wire member bent adjacent to the first end wire member bent adjacent to the first end inserted through one side of the cylindrical body core and the barrel swivel extending out from the transverse hole.
Figure 8:
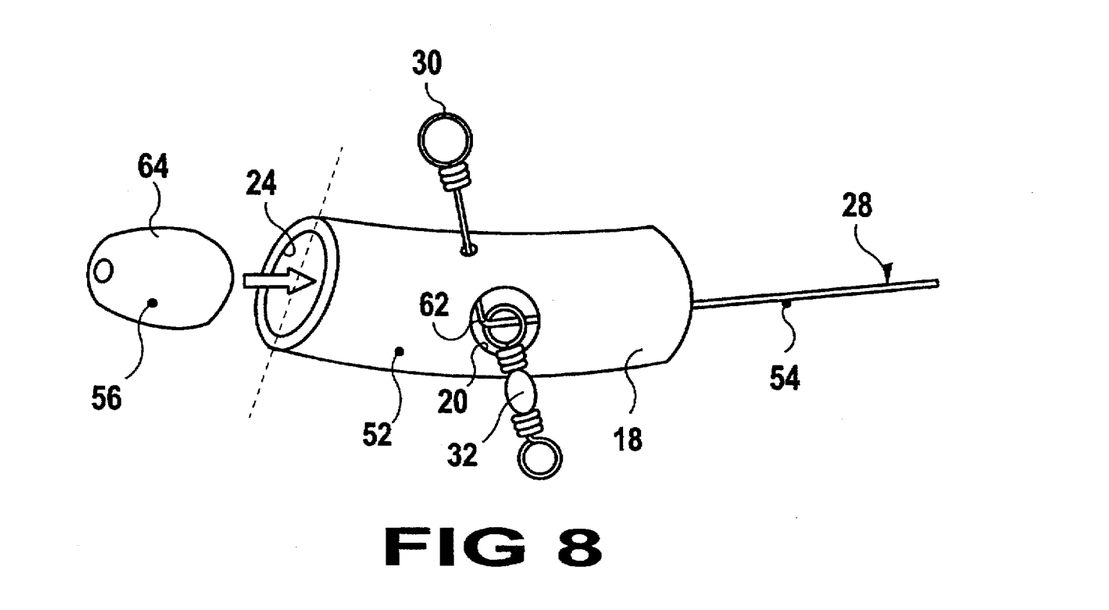
FIG. 8 is a perspective view similar to FIG. 7, showing a lead weight ready to be inserted into the mouth of the cylindrical body core.
Figure 9:
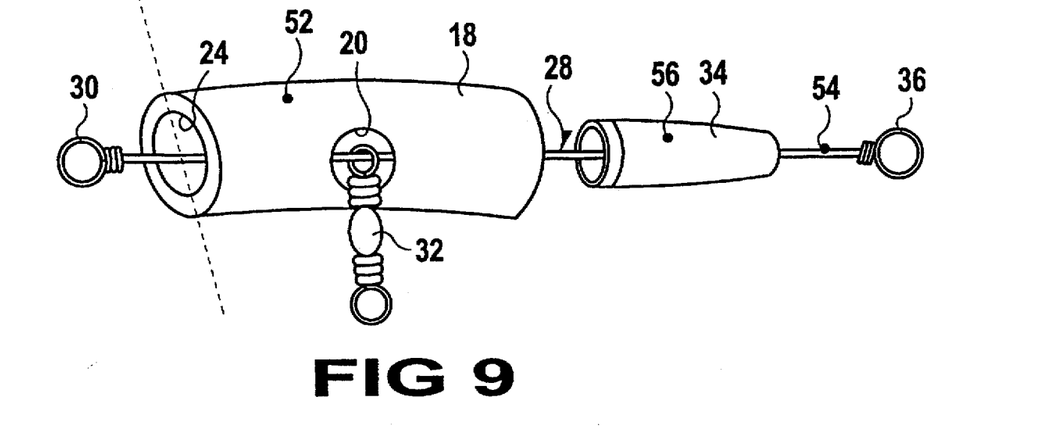
FIG. 9 is a perspective view similar to FIG. 6, showing a lead weight on the center wire at a rearward end of the cylindrical body core and a tail loop formed on a rearward end of the center wire.
Figure 10:
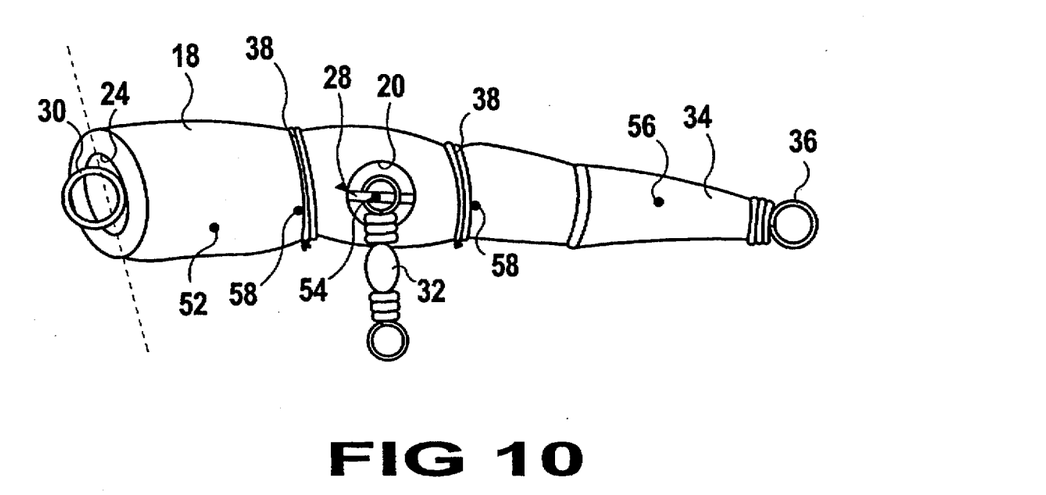
FIG. 10 is a perspective view similar to FIG. 9, showing thin wire wraps about the cylindrical body core on opposite sides of the barrel swivel.
Figure 11A:
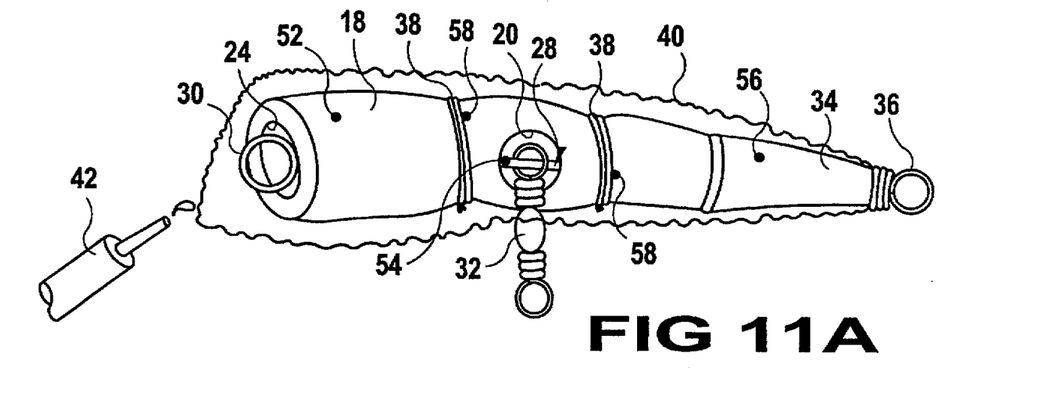
FIG. 11A is a perspective view similar to FIG. 10, showing a silicone skin being applied thereto.
Figure 11B:
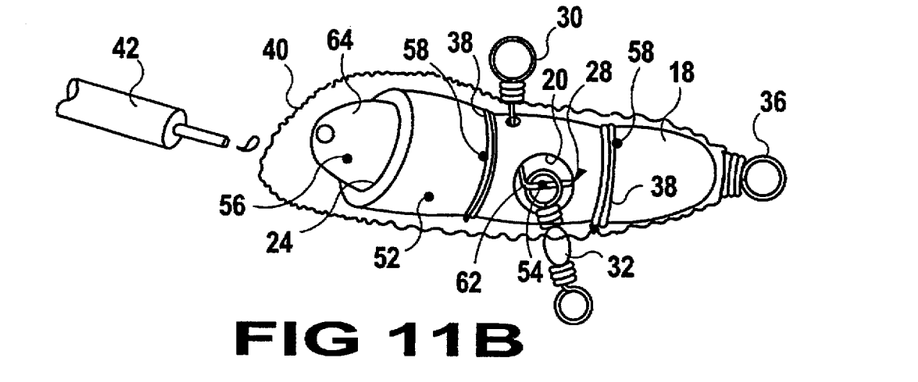
FIG. 11B is a perspective view similar to FIG. 8, showing thin wire wraps about the cylindrical body core on opposite sides of the barrel swivel, a tail loop formed on a second end of the center wire and a silicone skin being applied thereto.
Figure 12:
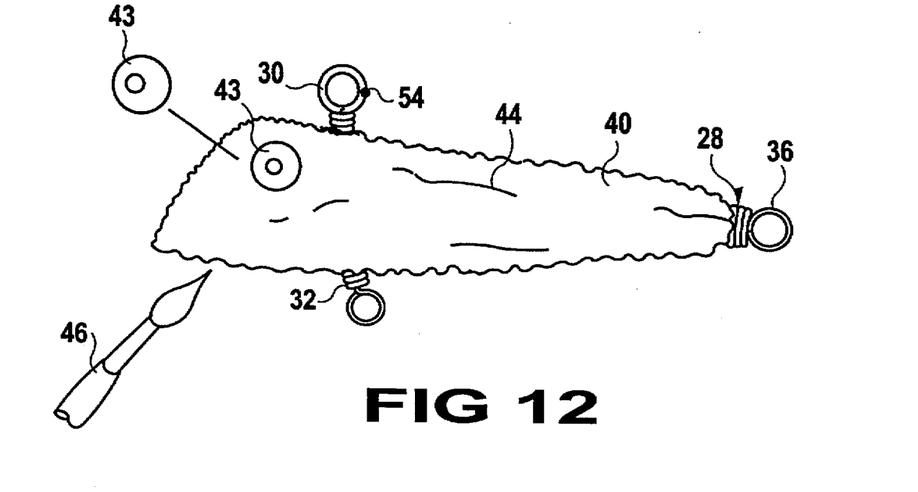
FIG. 12 is a perspective view similar to FIG. 11B, showing a movable eye and paint being applied onto the silicone skin.
Figure 13:
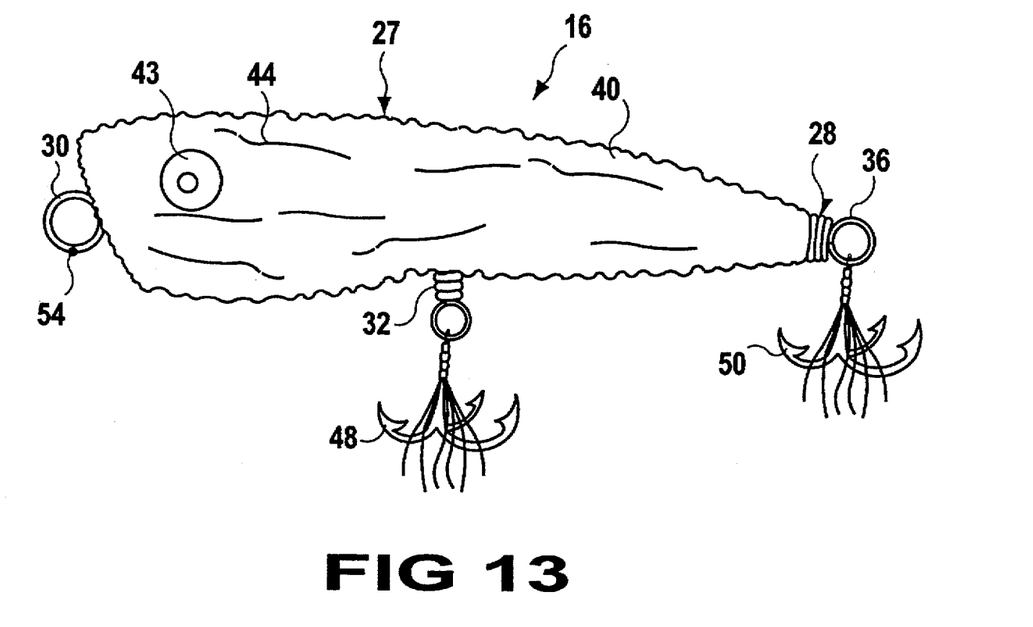
FIG. 13 is a perspective view similar to FIG. 11A, showing a movable eye and paint applied onto the silicone skin and treble hooks attached to the barrel swivel and tail loop.
Figure 14:
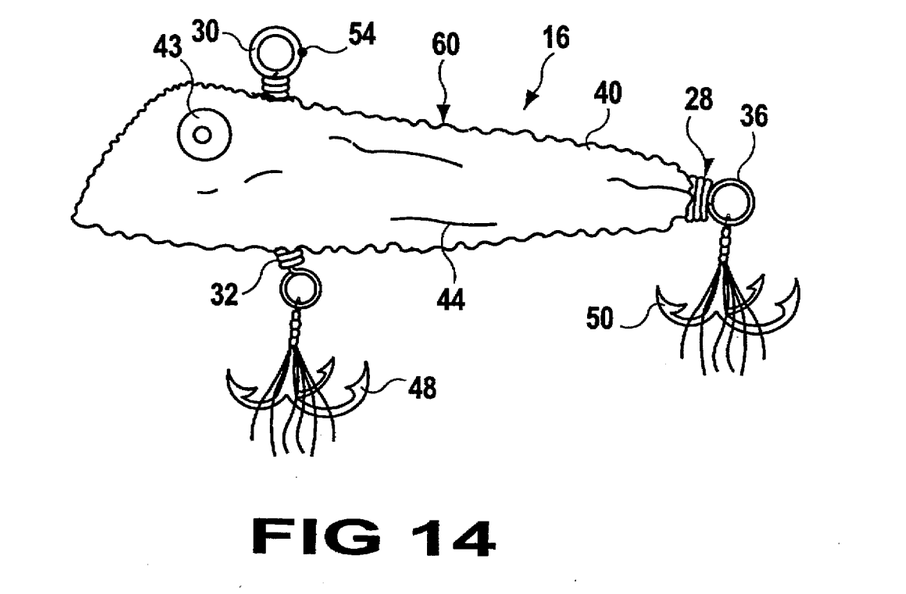
FIG. 14 is a perspective view similar to FIG. 12, showing the movable eye and paint applied onto the silicone skin and treble hooks attached to the barrel swivel and the tail loop.

The bug master fishing lure 16, as shown in FIGS. 1 to 3, 4A to 6, 9 to 11A and 13, comprises a soft and flexible cylindrical body core 18 having a transverse hole 20 in the middle thereof made with a hot iron 22 (see FIG. 2). A mouth 24 at a forward end made with another hot iron 26 (see FIG. 3), faces at an angle downward be utilized in making a surface popper 27, as in FIG. 13, so as to create a surface splashing action in water. A wire member 28 has an eye 30 formed on a first end. The wire member 28 is inserted through the body core 18, with the eye located at the mouth 24 (see FIG. 6). A barrel swivel 32 is carried on the wire member 28 and extends out through the transverse hole 20 in the middle of the body core 18. A weight 34 is inserted onto the wire member 28 adjacent to a rearward end of the body core 18. A tail loop 36 is formed on a second end of the wire member 28. The weight 34 adds distance in casting and to keep the tail down during retrieval.

A pair of thin wires 38 are provided. Each thin wire 38 is wrapped about the body core 18 on opposite sides of the barrel swivel 32, to reinforce and snug up the body core 18 internally to the wire member 28. A silicone skin 40 is coated over the body core 18 the weight 34 and the thin wire 38 by an applicator tube 42, as in FIG. 11A, adds a realistic shape thereto. A soft but tough characteristic of the silicone skin 40 will cause a fish to hold onto the silicone skin 40, and not reject it because of its soft natural feel. A pair of movable eyes 43 are attached to a forward end of the silicone skin 40, to give an extremely realistic look thereto and to also add a rattling noise which will anger game fish and cause them to strike savagely. Paint 44 is placed upon the silicone skin 40 by a paintbrush 46. A pair of treble hooks 48, are provided. The first treble hook 48 is affixed to the barrel swivel 32, while the second treble hook 50 is affixed to the tail loop 36.

The body core 18 is fabricated out of a solid foam material 52. The wire member 28 is fabricated out of a pliable metal material 54. The weight 34 is fabricated out of lead 56. The thin wire 38 is fabricated out of a malleable metal material 58. The various components of the bug master fishing lure 16 in FIG. 1 to 3, 4B, 7, 8, 11B, 12 and 14, consists of the soft flexible cylindrical body core 18 having the transverse hole 20 in the middle thereof, made with the hot iron 22. The mouth 24 at the forward end made with the other hot iron 26 faces at an angle upward to be utilized in making a diver 60, as in FIG. 14, so as to create a diving, wobbling action in water. The wire member 28 has the eye 30 formed on a first end and is bent generally at a right angle at 62 (see FIGS. 7, 8 and 11B). The wire member 28 is inserted through one side of the body core 18 and out through a rearward end, with the eye 30 located at the side of the body core 18. The barrel swivel 32 is carried on the wire member 28 and extends out through the transverse hole 20 in the middle of the body core 18.

A weight 64 is inserted into the mouth 24 at the forward end of the body core 18, whereby the tail loop 36 is formed on the second end of the wire member 28. The weight 64 facilitates a diving, wobbling action. The pair of thin wires 38 are wrapped about the body core 18 on opposite sides of the barrel swivel 32, to reinforce and snug up the body core 18 internally to the wire member 28. The silicone skin 40 is coated over the body core, the weight 64 and the thin wires 38 by the applicator tube 42, as in FIG. 11B, to add a realistic shape thereto. The soft but tough characteristic of the silicone skin 40 will cause a fish to hold onto the silicone skin 40 and not reject it because of its soft natural feel.

The pair of movable eyes 43 are attached to the forward end of the silicone skin 40, to give an extremely realistic look thereto and to also add a rattling noise which will anger game fish and cause them to strike savagely. the paint 44 is placed upon the silicone skin 40 by the paintbrush 46. The pair of treble hooks 48, 50 are also provided. The first treble hook 48 is affixed to the barrel swivel 32, while the second treble hook 50 is affixed to the tail loop 36.

The body core 18 is also fabricated out of solid foam material 52. The wire member 28 is also fabricated out of pliable metal material 54. The weight 64 is fabricated out of lead 56. Each thin wire 38 is also fabricated out of malleable metal material 58.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fishing lure comprising:
   a) a flexible cylindrical core having a centrally located recess and a mouth at a forward end thereof;
   b) a wire member including an eye on a first end thereof inserted through said core with said eye extending from said core and a tail loop formed on a second end thereof;
   c) a barrel swivel carried on said wire member and extending through said centrally located recess;
   d) a weight positioned within said core;
   e) first and second thin wires, each thin wire wrapped around said core on opposing sides of said barrel swivel for reinforcing and snugging up said core to said wire member; and
   f) a silicone skin coated over said cylindrical core, said weight and said thin wires to add a realistic shape thereto.

2. The fishing lure as claimed in claim 1, wherein said eye of said wire member is positioned at said mouth of said core.

3. The fishing lure as claimed in claim 2, wherein said weight is inserted onto said wire member and positioned at an end of said core opposite said mouth.

4. The fishing lure as claimed in claim 3, further comprising a pair of movable eyes attached to a forward end of said silicone skin.

5. The fishing lure as claimed in claim 4, further comprising paint placed upon said silicone skin.

6. The fishing lure as claimed in claim 5, further comprising first and second treble hooks, said first treble hook being affixed to said barrel swivel and said second treble hook being affixed to said tail loop.

7. The fishing lure as claimed in claim 1, wherein said wire member is bent at a substantially 90° angle whereby said eye extends from a side of said core.

8. The fishing lure as claimed in claim 7, wherein said weight is positioned at said forward end of said core.

9. The fishing lure as claimed in claim 8, further comprising a pair of movable eyes attached to a forward end of said silicone skin.

10. The fishing lure as claimed in claim 9, further comprising paint placed upon said silicone skin.

11. The fishing lure as claimed in claim 10, further comprising first and second treble hooks, said first treble hook being affixed to said barrel swivel and said second treble hook being affixed to said tail loop.

12. The fishing lure as claimed in claim 11, wherein said wire member is bent at a substantially 90° angle whereby said eye extends from a side of said core.

13. A bug master fishing lure comprising:
   a) a soft and flexible cylindrical body core having a transverse hole in the middle thereof and a mouth at a forward end facing at an angle downward to be utilized in making a surface popper, so as to create a surface splashing action in water;
   b) a wire member having an eye formed on a first end, whereby said wire member is inserted through said body core, with said eye located at said mouth;
   c) a barrel swivel carried on said wire member and extending out through said transverse hole in the middle of said body core;
   d) a weight inserted onto said wire member adjacent to a rearward end of said body core, whereby a tail loop is formed on a second end of said wire member, said weight adds distance in casting and to keep the tail down during retrieval;

e) a pair of thin wires, each said thin wire wrapped about said body core on opposite sides of said barrel swivel to reinforce and snug up said body core internally to said wire member;

f) a silicone skin coated over said body core, said weight and said thin wires to add a realistic shape thereto, whereby a soft but tough character of said silicone skin will cause a fish to hold onto said silicone skin and not reject it because of its soft natural feel;

g) a pair of movable eyes attached to a forward end of said silicone skin, to give an extremely realistic look thereto and to also add a rattling noise which will anger game fish and cause them to strike savagely;

h) paint placed upon said silicone skin; and i) a pair of treble hooks, wherein said first treble hook is affixed to said barrel swivel, while said second treble hook is affixed to said tail loop.

14. A bug master fishing lure as recited in claim 13, wherein said body core is fabricated out of a solid foam material.

15. A bug master fishing lure as recited in claim 13, wherein said wire member is fabricated out of a pliable metal material.

16. A bug master fishing lure as recited in claim 13, wherein said weight is fabricated out of lead.

17. A bug master fishing lure as recited in claim 13, wherein each said thin wire is fabricated out of a malleable metal material.

18. A bug master fishing lure comprising:

a) a soft and flexible cylindrical body core having a transverse hole in the middle thereof and a mouth at a forward end facing at an angle upward to be utilized in making a diver, so as to create a diving, wobbling action in water;

b) a wire member having an eye formed on a first end and bent generally at a right angle, whereby said wire member is inserted through one side of said body core and out through a rearward end, with said eye located at the side of said body core;

c) a barrel swivel carried on said wire member and extending out through said transverse hole in the middle of said body core;

d) a weight inserted into said mouth at said forward end of said body core, whereby a tail loop is formed on a second end of said wire member, the weight facilitates a diving, wobbling action;

e) a pair of thin wires, each said thin wire wrapped about said body core on opposite sides of said barrel swivel, to reinforce and snug up said body core internally to said wire member;

f) a silicone skin coated over said body core, said weight and said thin wire to add a realistic shape thereto, whereby a soft but tough characteristic of said silicone skin will cause a fish to hold onto said silicone skin and not reject it because of its soft natural feel;

g) a pair of movable eyes attached to a forward end of said silicone skin, to give an extremely realistic look thereto and to also add a rattling noise which will anger game fish and cause them to strike savagely;

h) paint placed upon said silicone skin; and i) a pair of treble hooks, wherein said first treble hook is affixed to said barrel swivel, while said second treble hook is affixed to said tail loop.

19. A bug master fishing lure as recited in claim 18, wherein said body core is fabricated out of a solid foam material.

20. A bug master fishing lure as recited in claim 18, wherein said wire member is fabricated out of a pliable metal material.

21. A bug master fishing lure as recited in claim 18, wherein said weight is fabricated out of lead.

22. A bug master fishing lure as recited in claim 18, wherein each said thin wire is fabricated out of a malleable metal material.

23. A bug master fishing lure comprising:

a) a soft and flexible cylindrical body core having a transverse hole in the middle thereof and a mouth at a forward end facing at an angle downward to be utilized in making a surface popper, so as to create a surface splashing action in water, wherein said body core is fabricated out of a solid foam material;

b) a wire member having an eye formed on a first end, whereby said wire member is inserted through said body core, with said eye located at said mouth;

c) a barrel swivel carried on said wire member and extending out through said transverse hole in the middle of said body core;

d) a weight inserted onto said wire member adjacent to a rearward end of said body core, whereby a tail loop is formed on a second end of said wire member, said weight adds distance in casting and to keep the tail down during retrieval;

e) a pair of thin wires, each said thin wire wrapped about said body core on opposite sides of said barrel swivel, to reinforce and snug up said body core internally to said wire member;

f) a silicone skin coated over said body core, said weight and said thin wire to add a realistic shape thereto, whereby a soft but tough characteristic of said silicone skin will cause a fish to hold onto said silicone skin and not reject it because of its soft natural feel;

g) a pair of movable eyes attached to a forward end of said silicone skin, to give an extremely realistic look thereto and to also add a rattling noise which will anger game fish and cause them to strike savagely;

h) paint placed upon said silicone skin; and i) a pair of treble hooks, wherein said first treble hook is affixed to said barrel swivel, while said second treble hook is affixed to said tail loop.

24. A bug master fishing lure as recited in claim 23, wherein said wire member is fabricated out of a pliable metal material.

25. A bug master fishing lure as recited in claim 24, wherein said weight is fabricated out of lead.

26. A bug master fishing lure as recited in claim 25, wherein each said thin wire is fabricated out of a malleable metal material.

27. A bug master fishing lure comprising:

a) a soft and flexible cylindrical body core having a transverse hole in the middle thereof and a mouth at a forward end facing at an angle upward to be utilized in making a diver, so as to create a diving, wobbling action in water, wherein said body core is fabricated out of a solid foam material;

b) a wire member having an eye formed on a first end and bent generally at a right angle, whereby said wire member is inserted through one side of said body core and out through a rearward end, with said eye located at the side of said body core;

c) a barrel swivel carried on said wire member and extending out through said transverse hole in the middle of said body core;

d) a weight inserted into said mouth at said forward end of said body core, whereby a tail loop is formed on a second end of said wire member, the weight facilitates a diving, wobbling action;

e) a pair of thin wires, each said thin wire wrapped about said body core on opposite sides of said barrel swivel to reinforce and snug up said body core internally to said wire member;

f) a silicone skin coated over said body core, said weight and said thin wires to add a realistic shape thereto, whereby a soft but tough character of said silicone skin will cause a fish to hold onto said silicone skin and not reject it because of its soft natural feel;

g) a pair of movable eyes attached to a forward end of said silicone skin, to give an extremely realistic look thereto and to also add a rattling noise which will anger game fish and cause them to strike savagely;

h) paint placed upon said silicone skin; and i) a pair of treble hooks, wherein said first treble hook is affixed to said barrel swivel, while said second treble hook is affixed to said tail loop.

28. A bug master fishing lure as recited in claim 27, wherein said wire member is fabricated out of a pliable metal material.

29. A bug master fishing lure as recited in claim 28, wherein said weight is fabricated out of lead.

30. A bug master fishing lure as recited in claim 29, wherein each said thin wire is fabricated out of a malleable metal material.

* * * * *